Patented July 4, 1944

2,352,943

UNITED STATES PATENT OFFICE 2,352,943

REACTION PRODUCT OF ALDEHYDES AND DIAZINE DERIVATIVES

Gaetano F. D'Alelio and James W. Underwood, Pittsfield, Mass., assignors to General Electric Company, a corporation of New York No Drawing. Application June 30, 1942, Serial No. 449,166

20 Claims. (Cl. 260—42)

This invention relates to the production of new synthetic materials and more particularly to new reaction products of particular utility in the plastics and coating arts. Specifically the invention is concerned with compositions of matter comprising a condensation product of ingredients comprising an aldehyde, including polymeric aldehydes, hydroxyaldehydes and aldehyde-addition products, e. g., formaldehyde, paraformaldehyde, aldol, dimethylol urea, trimethylol melamine, etc., and a diazine derivative corresponding to the following general formula:

I

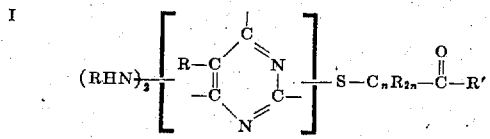

where $n$ represents an integer and is at least 1 and not more than 2. R represents a member of the class consisting of hydrogen and monovalent hydrocarbon and substituted hydrocarbon radicals, more particularly halo-hydrocarbon radicals, and R' represents a member of the class consisting of monovalent aliphatic hydrocarbon radicals and monovalent aromatic and nuclearly substituted, specifically halogenated, aromatic hydrocarbon radicals.

Illustrative examples of radicals that R in the above formula may represent are: aliphatic (e. g., methyl, ethyl, propyl, isopropyl, butyl, secondary butyl, isobutyl, butenyl, amyl, isoamyl, hexyl, octyl, allyl, methallyl, crotyl, etc.), including cycloaliphatic (e. g., cyclopentyl, cyclopentenyl, cyclohexyl, cyclohexenyl, cycloheptyl, etc.); aryl (e. g., phenyl, diphenyl or xenyl, naphthyl, etc.); aliphatic-substituted aryl (e. g., tolyl, xylyl, ethylphenyl, propylphenyl, isopropylphenyl, allylphenyl, 2-butenylphenyl, tertiary-butylphenyl, etc.); aryl-substituted aliphatic (e. g., benzyl, cinnamyl, phenylethyl, phenylpropyl, etc.); and their homologues, as well as those groups with one or more of their hydrogen atoms substituted by, for example, a halogen, more particularly chlorine, bromine, fluorine or iodine. Specific examples of halogeno-substituted hydrocarbon radicals that R in the above formula may represent are: chloromethyl, chloroethyl, chlorophenyl, dichlorophenyl, ethyl chlorophenyl, chlorocyclohexyl, phenyl chloroethyl, bromoethyl, bromopropyl, fluorophenyl, iodophenyl, bromotolyl, etc.

Illustrative examples of monovalent aliphatic and aromatic hydrocarbon radicals that R' in the above formula may represent are: methyl, ethyl, propyl, isopropyl, butyl, secondary butyl, isobutyl, butenyl, amyl, isoamyl, hexyl, octyl, allyl, methallyl, ethallyl, crotyl, cyclopentyl, cyclopentenyl, cyclohexyl, cyclohexenyl, cycloheptyl, benzyl, cinnamyl, phenylethyl, phenylpropyl, phenyl, diphenyl, naphthyl, anthracyl, tolyl, xylyl, ethylphenyl, propylphenyl, isopropylphenyl, allylphenyl, propenylphenyl, 2-butenylphenyl, tertiary-butylphenyl, methylnaphthyl and the like. Illustrative examples of monovalent, nuclearly substituted, specifically nuclearly halogenated, aromatic hydrocarbon radicals that R' may represent are: chlorophenyl, dichlorophenyl, bromophenyl, dibromophenyl, iodophenyl, fluorophenyl, chlorotolyl, bromotolyl, chloroxylyl, chloronaphthyl, dichloronaphthyl, chloroxenyl, dichloroxenyl, bromoxenyl and the like.

Preferably R in Formula I is hydrogen. Also especially suitable for use in carrying the present invention into effect are diazine derivatives corresponding to the general formula:

II

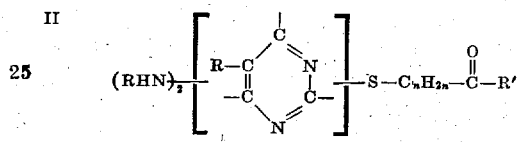

and, more particularly,

III

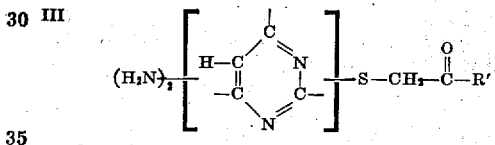

and

IV

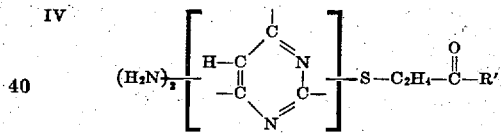

where $n$, R and R' have the same meanings as given above with reference to Formula I.

Instead of the 1,3- or meta-diazine (pyrimidine) derivatives represented by the above formulas, the corresponding 1,2- or ortho-diazine (pyridazine) derivatives or the 1,4- or para-diazine (pyrazine) derivatives may be used. Also, instead of the mono-thio diazine derivatives represented by the above formulas, the corresponding ketonic-substituted di-thio derivatives of the diazines (ortho, meta or para) may be employed.

The diazine derivatives that are used in carrying the present invention into effect are more fully described and are specifically claimed in our copending application Serial No. 449,167, filed concurrently herewith and assigned to the same assignee as the present invention. As pointed out in this copending application, diazine derivatives of the kind employed in practicing the present invention are prepared by effecting reaction in the presence of a hydrohalide acceptor, e. g., an alkali-metal hydroxide, between a mercapto (monomercapto) diamino [(—NHR)₂] pyrimidine and a halogenated ketone corresponding to the formula

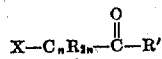

where X represents a halogen atom and $n$, R and R' have the same meanings as given above with reference to Formula I.

Examples of diazine derivatives embraced by Formula I that are suitable for use in producing the new condensation products of the present invention are listed below:

The (diamino pyrimidyl thio methyl) aliphatic (e. g., alkyl, alkenyl) ketones, including the (4,6-diamino pyrimidyl-2 thio methyl) aliphatic ketones and the 2,6-diamino pyrimidyl-4 thio methyl) aliphatic ketones
The (diamino pyrimidyl thio methyl) aromatic ketones
The (diamino pyrimidyl thio methyl) nuclearly halogenated aromatic ketones
The alpha-(diamino pyrimidyl thio ethyl) aliphatic ketones
The alpha-(diamino pyrimidyl thio ethyl) aromatic ketones
The alpha-(diamino pyrimidyl thio ethyl) nuclearly halogenated aromatic ketones
The beta-(diamino pyrimidyl thio ethyl) aliphatic ketones
The beta-(diamino pyrimidyl thio ethyl) aromatic ketones
The beta-(diamino pyrimidyl thio ethyl) nuclearly halogenated aromatic ketones
(4,6-diamino 5-methyl pyrimidyl-2 thio methyl) methyl ketone
[4,6-di-(methylamino) pyrimidyl-2 thio methyl] methyl ketone
[4,6-di-(isobutylamino) pyrimidyl-2 thio methyl] methyl ketone
[4,6-di-(propenylamino) pyrimidyl-2 thio methyl] ethyl ketone
(4,6-dianilino pyrimidyl-2 thio methyl) ethyl ketone
[4,6-di-(methylamino) pyrimidyl-2 thio methyl] propyl ketone
(4,6-dianilino pyrimidyl-2 thio methyl) propenyl ketone
(4,6-ditoluido pyrimidyl-2 thio methyl) phenethyl ketone
(4,6-dixylidino pyrimidyl-2 thio methyl) phenyl ketone
[4,6-di-(naphthylamino) pyrimidyl-2 thio methyl] phenyl ketone
[2,6-di-(methylamino) 5-methyl pyrimidyl-4 thio ethyl] methyl ketones
[4,6-di-(phenethylamino) 5-tolyl pyrimidyl-2 thio ethyl] vinyl ketones
[Beta-(4,6-dianilino 5-methyl pyrimidyl-2 thio) ethyl] methyl ketone
[Alpha-fluorophenyl beta-(4,6-diamino pyrimidyl-2 thio) ethyl] ethyl ketone
[Beta-(4-methylamino 5-methyl 6-amino pyrimidyl-2 thio) ethyl] phenyl ketone
[4,6-di-(methylamino) pyrimidyl-2 thio methyl] tolyl ketones
[2,6-di-(ethylamino) pyrimidyl-4 thio methyl] phenyl ketone
[4,6-di-(butylamino) pyrimidyl-2 thio methyl] phenyl ketone
[2,6-di-(propenylamino) pyrimidyl-4 thio methyl] phenyl ketone
[4,6-di-(cyclopentylamino) pyrimidyl-2 thio methyl] phenyl ketone
(4,6-dianilino pyrimidyl-2 thio methyl) phenyl ketone
(4,6-ditoluido pyrimidyl-2 thio methyl) chlorophenyl ketones
[4,6-di-(naphthylamino) pyrimidyl-2 thio methyl] bromotolyl ketones
[2,6-di-(chloroethylamino) pyrimidyl-4 thio methyl] iodophenyl ketones.
(4,6-diamino pyrimidyl-2 thio methyl) xylyl ketones
(2,6-diamino pyrimidyl-4 thio methyl) ethylphenyl ketones
(4,6-diamino pyrimidyl-2 thio methyl) propenylphenyl ketones
(4,6-dianilino pyrimidyl-2 thio methyl) xenyl ketone
[4,6-di-(methylamino) pyrimidyl-2 thio methyl] propylphenyl ketones
[Alpha-propyl beta-(4-anilino 5-iodophenyl 6-amino pyrimidyl-2 thio) ethyl] benzyl ketone
[Beta-(4-anilino 5-propyl 6-methylamino pyrimidyl-2 thio) ethyl] cyclopentyl ketone
[Alpha-(4,6-diamino 5-chloroethyl pyrimidyl-2 thio) butyl] tolyl ketones
[4,6-di-(methylamino) 5-methyl pyrimidyl-2 thio methyl] methyl ketone
(4,6-dianilino 5-methyl pyrimidyl-2 thio methyl) methyl ketone
[4,6-di-(bromoanilino) 5-methyl pyrimidyl-2 thio methyl] phenyl ketone
[4,6-di-(cyclopentylamino) pyrimidyl-2 thio methyl] ethylphenyl ketones
[Beta-(4,6-diamino pyrimidyl-2 thio) ethyl] phenyl ketone
Alpha-(2,6-diamino pyrimidyl-4 thio) ethyl] phenyl ketone
[Alpha-(4,6-diamino pyrimidyl-2 thio) ethyl] phenyl ketone
[Beta-(2,6-diamino pyrimidyl-4 thio) ethyl] phenyl ketone
(Diamino pyrimidyl thio methyl) chlorophenyl ketones
(Diamino pyrimidyl thio methyl) bromophenyl ketones
(Diamino pyrimidyl thio methyl) iodophenyl ketones
(Diamino pyrimidyl thio methyl) fluorophenyl ketones
(Diamino pyrimidyl thio methyl) heptyl ketones
(Diamino pyrimidyl thio ethyl) octyl ketones
(4,6-diamino pyrimidyl-2 thio methyl) phenyl ketone
(2,6-diamino pyrimidyl-4 thio methyl) phenyl ketone
(4,6-diamino pyrimidyl-2 thio methyl) para-chloroxenyl ketone
(4,6-diamino pyrimidyl-2 thio methyl) methyl ketone
[4,6-di-(methylamino) pyrimidyl-2 thio methyl] phenyl ketone
[4,6-di-(ethylamino) pyrimidyl-2 thio methyl] para-chloroxenyl ketone
(Diamino pyrimidyl thio ethyl) naphthyl ketones
(Diamino pyrimidyl thio ethyl) anthracyl ketones
[Alpha-(4,6-diamino pyrimidyl-2 thio) ethyl] tolyl ketones ucts, for instance formaldehyde, paraformaldehyde, glyceraldehyde, dimethylol urea, a polymethylol melamine, e. g., hexamethylol melamine, etc. Thereafter we may effect reaction between this partial condensation product and, for example, a curing reactant, specifically a chlorinated acetamide, to obtain a heat-curable composition.

Some of the condensation products of this invention are thermoplastic materials even at an advanced stage of condensation, while others are thermosetting or potentially thermosetting bodies that convert under heat or under heat and pressure to an insoluble, infusible state. The thermoplastic condensation products are of particular value as plasticizers for other synthetic resins of unsatisfactory plasticity characteristics. The thermosetting or potentially thermosetting resinous condensation products, alone or mixed with fillers, pigments, dyes, lubricants, plasticizers, curing agents, etc., may be used, for example, in the production of molding compositions.

The liquid intermediate condensation products of this invention may be concentrated or diluted further by the removal or addition of volatile solvents to form liquid coating compositions of adjusted viscosity and concentration. The heat-convertible or potentially heat-convertible resinous condensation products may be used in liquid state, for instance as surface-coating materials, in the production of paints, varnishes, lacquers, enamels, etc., for general adhesive applications, in producing laminated articles and for numerous other purposes. The liquid heat-hardenable or potentially heat-hardenable condensation products also may be used directly as casting resins, while those which are of a gel-like nature in partially condensed state may be dried and granulated to form clear, unfilled heat-convertible resins.

In order that those skilled in the art better may understand how the present invention may be carried into effect, the following examples are given by way of illustration and not by way of limitation. All parts are by weight.

Example 1

| | Parts |
|---|---|
| (4,6-diamino pyrimidyl-2 thio methyl) parachloroxenyl ketone | 90.4 |
| Aqueous formaldehyde (approx. 37.1% HCHO) | 121.5 |
| Sodium hydroxide in 5 parts water | 0.1 | were heated together under reflux at the boiling temperature of the mass for 30 minutes, yielding a syrupy condensation product that bodied to a thermoelastic resinous mass when a sample of it was heated on a 140° C. hot plate. This resinous material was potentially heat-curable as shown by the fact that when chloroacetamide (monochloroacetamide) and other curing agents such as hereafter mentioned were incorporated either into the syrupy product or into the thermoelastic resin, followed by heating on a 140° C. hot plate, the resin was cured to an insoluble and infusible state.

To 115 parts of the resinous syrup obtained as above described there was added 0.5 part of a curing reactant, specifically sulfamic acid. The resulting mixture was heated under reflux at boiling temperature for 2 minutes to cause the sulfamic acid to intercondense with the partial condensation product of the pyrimidine derivative and formaldehyde. The resinous syrup thereby produced was mixed with 35 parts alpha cellulose in flock form and 0.2 part of a mold lubricant, specifically zinc stearate, to form a molding (moldable) compound. The wet molding composition was dried for 3 hours at 75° C. A well-cured molded piece having very good resistance to water was obtained by molding a sample of the dried and ground molding compound for 5 minutes at 130° C. under a pressure of 2,000 pounds per square inch.

Instead of using sulfamic acid in accelerating the curing of the potentially reactive resinous material, heat-convertible compositions may be produced by adding to the partial condensation product (in syrupy or other form) direct or active curing catalysts (e. g., citric acid, phthalic anhydride, malonic acid, oxalic acid, etc.), or latent curing catalysts (e. g., sodium chloroacetate, N-diethyl chloroacetamide, glycine ethyl ester hydrochloride, etc.), or by intercondensation with curing reactants other than sulfamic acid (e. g., mono-, di- and trichloroacetamides, chloroacetonitriles, alpha, beta-dibromopropionitrile, aminoacetamide hydrochloride, ethylene diamine monohydrochloride, the ethanolamine hydrochlorides, nitrourea, chloroacetyl urea, chloroacetone, glycine, citric diamide, phenacyl chloride, etc.). Other examples of active and latent curing catalysts and of curing reactants that may be employed to accelerate or to effect the curing of the thermosetting or potentially thermosetting resins of this and other examples are given in various copending applications of one or both of us, for instance in D'Alelio copending applications Serial No. 346,962, filed July 23, 1940, and Serial No. 354,395, filed August 27, 1940, both of which applications are assigned to the same assignee as the present invention. There are now Patents 2,325,375 and 3,325,376, respectively, both issued July 27, 1943.

Example 2

| | Parts |
|---|---|
| (4,6-diamino pyrimidyl-2 thio methyl) phenyl ketone | 26.0 |
| Aqueous formaldehyde (approx. 37.1% HCHO) | 48.6 |
| Aqueous solution of sodium hydroxide (0.457 N) | 1.7 | were heated together under reflux at the boiling temperature of the mass for 15 minutes, yielding a water-insoluble resin. To this resin was added 0.5 part chloroacetamide and refluxing was continued for about a minute longer. A molding compound was made from the resulting resinous composition by mixing therewith 35 parts alpha cellulose and 0.2 part zinc stearate. The wet compound was dried for 2 hours at 70° C. A sample of the dried and ground molding compound was molded for 4 minutes at 135° C. under a pressure of 2,000 pounds per square inch. The molded piece was well cured throughout and had good resistance to water. The molding compound showed good plastic flow during molding.

Example 3

| | Parts |
|---|---|
| (4,6-diamino pyrimidyl-2 thio methyl) parachloroxenyl ketone | 72.1 |
| Urea | 108.0 |
| Aqueous formaldehyde (approx. 37.1% HCHO) | 324.0 |
| Sodium hydroxide in 15 parts water | 0.3 | were heated together under reflux at the boiling temperature of the mass for 30 minutes, yielding a thick resinous syrup. When a sample of this

[Beta - (2,6-diamino 5-chlorotolyl pyrimidyl-2 thio) ethyl] chlorotolyl ketones
[Alpha - ethyl beta-(4,6-diamino pyrimidyl-2 thio) ethyl] phenyl ketone
[Beta-phenyl alpha-(4,6-diamino 5-phenyl pyrimidyl-2 thio) ethyl] tolyl ketones It will be understood, of course, by those skilled in the art that, in those compounds listed above that are generically named, the amino (—NHR) groups and the ketonic-substituted thio groups may be attached in any arrangement to the symmetrical carbon atoms of the pyrimidine nucleus. In other words, the term "diamino pyrimidyl" includes within its meaning both the 4,6-diamino pyrimidyl-2 and the 2,6-diamino pyrimidyl-4 (2,4-diamino pyrimidyl-6) compounds.

The present invention is based on our discovery that new and valuable materials of particular utility in the plastics and coating arts can be produced by effecting reaction between ingredients comprising essentially an aldehyde, including polymeric aldehydes, hydroxyaldehydes and aldehyde-addition products, and diazine derivatives of the kind embraced by Formula I, numerous examples of which have been given above and in our above-identified copending application Serial No. 149,167.

It has been suggested heretofore that resins be made by condensing an aldehyde with a pyrimidine thioether, but such resins are not entirely satisfactory for use in many applications, for instance in the production of molding compounds having a high plastic flow during molding combined with a rapid cure to an insoluble, infusible state. Surprisingly it was found that the heat-curable resinous condensation products of this invention and molding compositions made therefrom show excellent flow characteristics during a short curing cycle. This is a property that is particularly desirable in a thermosetting resin and molding compound. The molded articles have a high dielectric strength and very good resistance to arcing. They have a good surface finish and excellent resistance to water, being better than the ordinary urea-formaldehyde resins in this respect. The cured resins have a high resistance to heat and abrasion, and therefore are especially suitable for use where optimum heat- and abrasion-resistance are properties of primary importance.

In practicing our invention the initial condensation reaction may be carried out at normal or at elevated temperatures, at atmospheric, sub-atmospheric or super-atmospheric pressures, and under neutral, alkaline or acid conditions. Preferably the reaction between the components is initiated under alkaline conditions.

Any substance yielding an alkaline or an acid aqueous solution may be used in obtaining alkaline or acid conditions for the initial condensation reaction. For example, we may use an alkaline substance such as sodium, potassium or calcium hydroxides, sodium or potassium carbonates, mono-, di- or tri-amines, etc. In some cases it is desirable to cause the initial condensation reaction between the components to take place in the presence of a primary condensation catalyst and a secondary condensation catalyst. The primary catalyst advantageously is either an aldehyde-non-reactable nitrogen-containing basic tertiary compound, e. g., tertiary amines such as trialkyl (e. g., trimethyl, triethyl, etc.) amines, triaryl (e. g., triphenyl, tritolyl, etc.) amines, etc., an aldehyde-reactable nitrogen-containing basic compound, for instance ammonia, primary amines (e. g., ethyl amine, propyl amine, etc.) and secondary amines (e. g., dipropyl amine, dibutyl amine, etc.). The secondary condensation catalyst, which ordinarily is used in an amount less than the amount of the primary catalyst, advantageously is a fixed alkali, for instance a carbonate, cyanide or hydroxide of an alkali metal (e. g., sodium, potassium, lithium, etc.).

Illustrative examples of acid condensation catalysts that may be employed are inorganic or organic acids such as hydrochloric, sulfuric, phosphoric, acetic, lactic, acrylic, malonic, etc., or acid salts such as sodium acid sulfate, monosodium phosphate, monosodium phthalate, etc. Mixtures of acids, of acid salts or of acids and of acid salts may be employed if desired.

The reaction between the aldehyde, e. g., formaldehyde, and the diazine derivative may be carried out in the presence of solvents or diluents, fillers, other natural or synthetic resinous bodies, or while admixed with other materials that also can react with the aldehydic reactant or with the diazine derivative, e. g., urea (NH$_2$CONH$_2$), thiourea, selenourea, iminourea (guanidine), substituted ureas, thioureas, selenoureas and iminoureas, numerous examples of which are given in various copending applications of one or both of us, for instance in D'Alelio copending application Serial No. 363,037, filed October 26, 1940, now Patent No. 2,322,566, issued June 22, 1943; monoamides of monocarboxylic and polycarboxylic acids and polyamides of polycarboxylic acids, e. g., acetamide, halogenated acetamides (e. g., a chlorinated acetamide), maleic monoamide, malonic monoamide, itaconic diamide, succinic diamide, phthalic diamide, the monoamide, diamide and triamide of tricarballylic acid, etc.; aldehyde-reactable diazines other than the diazine derivatives constituting the primary components of the resins of the present invention; aminotriazines, e. g., melamine, ameline, ammelide, melem, melam, melon, numerous other examples being given in various copending applications of one or both of us, for instance, in D'Alelio application Serial No. 377,524, filed February 5, 1941, and in applications referred to in said copending application; phenol and substituted phenols, e. g., the cresols, the xylenols, the tertiary alkyl phenols and other phenols such as mentioned in D'Alelio Patent No. 2,239,441; monohydric and polyhydric alcohols, e. g., butyl alcohol, amyl alcohol, isoamyl alcohol, heptyl alcohol, octyl alcohol, 2-ethylbutyl alcohol, ethylene glycol, glycerine, polyvinyl alcohol, etc.; amines, including aromatic amines, e. g., aniline, and the like.

The modifying reactants may be incorporated with the diazine derivative and the aldehyde by mixing all the reactants and effecting condensation therebetween or by various permutations of reactants as described, for example, in D'Alelio copending application Serial No. 363,037 with particular reference to reactions involving a urea, an aldehyde and oxanilic acid. For instance. we may form a partial condensation product of ingredients comprising (1) urea or melamine or urea and melamine, (2) a diazine derivative of the kind embraced by Formula I, for example a (diamino pyrimidyl thio methyl) aliphatic (e. g., alkyl, alkenyl) ketone, a (diamino pyrimidyl thio methyl) aromatic or nuclearly halogenated aromatic ketone, an [alpha- or beta-(diamino pyrimidyl thio) ethyl] aliphatic (or aromatic or nuclearly halogenated aromatic) ketone, etc., and (3) an aldehyde, including polymeric aldehydes, hydroxyaldehydes and aldehyde-addition prodsyrup was heated on a 140° C. hot plate, it bodied to a thermoplastic resin. The addition of sulfamic acid, chloroacetamide and other curing agents such as mentioned under Example 1 either to the syrupy condensation product or to the thermoplastic resin, followed by heating on a 140° C. hot plate, caused the resin to convert to a cured or insoluble and infusible state.

Five-tenths (0.5) part sulfamic acid was incorporated into 115 parts of the resinous syrup as described under Example 1. A molding composition was made from the resulting resinous syrup likewise as stated in Example 1. A well-cured molded piece having good resistance to water was produced by molding a sample of the dried and ground molding compound for 5 minutes at 130° C. under a pressure of 2,000 pounds per square inch. The plasticity of the molding composition during molding was very good as evidenced by the amount of flash on the molded piece.

Example 4

| | Parts |
|---|---|
| (4,6-diamino pyrimidyl-2 thio methyl) phenyl ketone | 26.0 |
| Urea | 54.0 |
| Aqueous formaldehyde (approx. 37.1% HCHO) | 162.0 |
| Aqueous solution of sodium hydroxide (0.457 N) | 5.1 |

The above components were heated together under reflux at the boiling temperature of the mass for 30 minutes, yielding a clear syrup. When a sample of this syrup was heated on a 135° C. hot plate, it bodied to a thermoplastic resin. The addition of a small amount of glycine, sulfamic acid, chloroacetamide, phenacyl chloride or other curing agent such as mentioned under Example 1 to the syrupy condensation product or to the thermoplastic resin, followed by heating on a 135–140° C. hot plate, yielded a cured or insoluble and infusible resin.

Five-tenths (0.5) part chloroacetamide was added to the resinous syrup produced as above described and the mixture was heated under reflux for about 1 minute. A molding composition was made from the resulting syrupy intercondensation product by mixing therewith 35 parts alpha cellulose and 0.2 part zinc stearate. The wet molding composition was dried until sufficient moisture had been removed to provide a material that could be molded satisfactorily. A well-cured molded piece was obtained by molding a sample of the dried and ground molding compound for 5 minutes at 135° C. under a pressure of 2,000 pounds per square inch. The plasticity of the molding compound during molding was very good.

Example 5

| | Parts |
|---|---|
| (4,6-diamino pyrimidyl-2 thio methyl) para-chloroxenyl ketone | 9.0 |
| Phenol (synthetic) | 90.0 |
| Aqueous formaldehyde (approx. 37.1% HCHO) | 195.0 |
| Potassium carbonate in 20 parts water | 2.85 |

A liquid phenol-formaldehyde partial condensation product was first prepared by heating together the above-stated amounts of phenol and formaldehyde in the presence of the stated amount of potassium carbonate for 3½ hours at 65–70° C. The pyrimidine derivative was added to the liquid phenolic resin and the mixture was heated under reflux for 45 minutes, resulting in an intercondensation product of the pyrimidine derivative and the phenol-formaldehyde partial condensation product. This syrupy intercondensation product was acidified with a solution of 5 parts oxalic acid dissolved in 50 parts water and then was compounded with 114 parts alpha cellulose and 1 part zinc stearate to form a molding compound. The wet molding composition was dried for 4 hours at 75° C. A well-cured molded piece having a well-knit and homogeneous structure was produced by molding a sample of the dried and ground molding compound for 5 minutes at 130° C. under a pressure of 2,000 pounds per square inch. The molding composition showed excellent flow characteristics during molding.

Example 6

| | Parts |
|---|---|
| (4,6-diamino pyrimidyl-2 thio methyl) phenyl ketone | 9.0 |
| Phenol (synthetic) | 90.0 |
| Aqueous formaldehyde (approx. 37.1% HCHO) | 195.0 |
| Potassium carbonate dissolved in a small amount of water | 4.85 |

Essentially the same procedure was followed in making the intercondensation product and molding composition as described under Example 5. The molded piece obtained by molding a sample of the dried and ground molding compound for 4 minutes at 135° C. under a pressure of 2,000 pounds per square inch was well cured throughout and had a homogeneous and well-knit structure. The plasticity of the molding compound during molding was excellent as evidenced by the amount of flash on the molded piece.

Example 7

| | Parts |
|---|---|
| (4,6-diamino pyrimidyl-2 thio methyl) para-chloroxenyl ketone | 36.2 |
| Furfural | 57.6 |
| Sodium hydroxide in 5 parts water | 0.1 | were heated together under reflux at the boiling temperature of the mass for 30 minutes, yielding a thick viscous resin. This resin cured to an insoluble and infusible state in the presence or absence of curing agents when samples of it were heated on a 140° C. hot plate. However, the addition of phthalic acid, sulfamic acid, phenacyl chloride, glycine, chloroacetone, chloroacetamide or other curing agent to the resin accelerated its cure. The resinous composition of this example may be used, for instance, in the preparation of molding compounds and as a modifier of other synthetic resins.

Example 8

| | Parts |
|---|---|
| (4,6-diamino pyrimidyl-2 thio methyl) phenyl ketone | 26.0 |
| Furfural | 57.6 |
| Aqueous solution of sodium hydroxide (0.457 N) | 1.7 | were heated together under reflux at the boiling temperature of the mass for 15 minutes, yielding a syrupy resin. This resin bodied to a thermoplastic mass when a sample of it was heated on a 135° C. hot plate. The thermoplastic resin was potentially heat-curable as shown by the fact that when glycine, chloroacetamide, sulfamic acid, citric diamide or other curing agent such as mentioned under Example 1 was added either to the syrupy condensation product or to the thermoplastic resin, followed by heating on a 135° C. hot plate, the resin cured to an insoluble and infusible state.

Example 9

| | Parts |
|---|---|
| (4,6-diamino pyrimidyl-2 thio methyl) para-chloroxenyl ketone | 36.2 |
| Acrolein | 33.6 |
| Sodium hydroxide in 5 parts water | 0.1 |
| Water | 100.0 | were heated together under reflux at the boiling temperature of the mass for 30 minutes. When a sample of the resulting resinous syrup was heated on a 140° C. hot plate, it cured rapidly to an insoluble and infusible state. The addition of phthalic anhydride, hydrochloric acid, sulfamic acid, nitrourea or other curing agent such as mentioned under Example 1 caused some acceleration in the curing of the heat-curable resin. The cured resin was very resistant to attack by water, alcohol, ethylene glycol and other solvents. The resinous composition of this example may be used, for instance, in the preparation of molding compounds.

Example 10

| | Parts |
|---|---|
| (4,6-diamino pyrimidyl-2 thio methyl) phenyl ketone | 26.0 |
| Acrolein | 33.6 |
| Aqueous solution of sodium hydroxide (0.457 N) | 1.7 |

The above ingredients were heated together under reflux for 30 minutes. The resulting resinous syrup was converted into a thermoplastic mass when a sample of it was heated on a 135° C. hot plate. The thermoplastic resin was potentially heat-curable as shown by the fact that the addition of a small amount of glycine, chloroacetamide, oxalic acid or other curing agent such as mentioned under Example 1, either to the resinous syrup or to the thermoplastic resin, followed by heating on a 135° C. hot plate, yielded a well-cured resin. The cured resin was quite resistant to water, alcohol and other solvents.

Example 11

| | Parts |
|---|---|
| (4,6-diamino pyrimidyl-2 thio methyl) para-chloroxenyl ketone | 36.2 |
| Butyl alcohol | 74.0 |
| Aqueous formaldehyde (approx. 37.1% HCHO) | 81.0 |
| Sodium hydroxide in 10 parts water | 0.2 | were heated together under reflux at the boiling temperature of the mass for 30 minutes, yielding a clear syrup. When a sample of this syrupy condensation product was heated on a 140° C. hot plate, it bodied to a thermoplastic resin. This thermoplastic resin was potentially heat-curable as evidenced by the fact that the addition of hydrochloric acid, glycine, chloroacetamide or other curing agent such as mentioned under Example 1, followed by heating on a 140° C. hot plate, caused the resin to cure to an insoluble and infusible state. The resinous material of this example is particularly suitable for use in the production of liquid coating and impregnating compositions.

Example 12

| | Parts |
|---|---|
| (4,6-diamino pyrimidyl-2 thio methyl) phenyl ketone | 26.0 |
| Butyl alcohol | 74.0 |
| Aqueous formaldehyde (approx. 37.1% HCHO) | 81.0 |
| Aqueous solution of sodium hydroxide (0.457 N) | 1.7 | were heated together under reflux at the boiling temperature of the mass for 30 minutes. This resulted in the production of a clear syrup which was converted into a thermoplastic resin when a sample of it was heated on a 135° C. hot plate. The thermoplastic resin is soluble in alcohol and other organic solvents. Heat-curable resinous materials are produced by incorporating glycine, sulfamic acid, phenacyl chloride, acetic acid, chloroacetic acid, nitrourea, chloral urea or other curing agent such as mentioned under Example 1 either into the syrupy condensation product or into the thermoplastic resin.

Example 13

| | Parts |
|---|---|
| (4,6-diamino pyrimidyl-2 thio methyl) para-chloroxenyl ketone | 36.2 |
| Diethyl malonate | 16.0 |
| Aqueous formaldehyde (approx. 37.1% HCHO) | 64.8 |
| Sodium hydroxide in 5 parts water | 0.1 |

The above ingredients were heated together under reflux at boiling temperature for 30 minutes, yielding a viscous resinous syrup. A sample of the substantially completely dehydrated resin was found to be soluble in Solvatone. A thermoplastic resin was produced by heating a sample of the viscous syrup on a 140° C. hot plate. This thermoplastic resin could be converted into a thermosetting resin by incorporating therein nitrourea, chloroacetamide, chloral urea, sulfamic acid, citric acid, chloroacetonitrile, phenacyl chloride, alpha, beta-dibromopropionitrile or other curing agent such as mentioned under Example 1. Transparent, water-repellent, cured films were obtained by baking coatings of the resin containing a curing agent for several hours at 75–80° C. The resinous material of this example may be used as a modifier of other synthetic resins. For instance, it may be used as a modifier of rapidly curing aminoplasts to control their flow or plasticity characteristics. It also may be used in coating compositions to provide materials of better flow characteristics.

Example 14

| | Parts |
|---|---|
| (4,6-diamino pyrimidyl-2 thio methyl) phenyl ketone | 26.0 |
| Diethyl malonate | 16.0 |
| Aqueous formaldehyde (approx. 37.1% HCHO) | 64.8 |
| Aqueous solution of sodium hydroxide (0.457 N) | 1.7 | were heated together under reflux at the boiling temperature of the mass for 30 minutes, yielding a syrupy resinous material. The dehydrated resin was soluble in ethyl alcohol and other organic solvents. When a sample of the resinous material was heated on a 135° C. hot plate, it was converted into a thermoplastic mass. The addition of hydrochloric acid, chloroacetamide, glycine, nitrourea or other curing agent such as mentioned under Example 1 to the syrupy condensation product or to the thermoplastic resin, followed by heating on a 135° C. hot plate, yielded a well-cured resin. When a sample of the resinous syrup containing a small amount of a curing agent was applied to a glass plate and the coated plate then was baked for a few hours at about 75° C., a hard, tough, transparent, water-repellent baked film was formed on the plate. The resinous material of this example may be used, for instance, in such applications as mentioned under Example 13.

*Example 15*

| | Parts |
|---|---|
| (4,6-diamino pyrimidyl-2 thio methyl) para-chloroxenyl ketone | 36.2 |
| Acetamide | 5.9 |
| Aqueous formaldehyde (approx. 37.1% HCHO) | 56.7 |
| Sodium hydroxide in 5 parts water | 0.1 | were heated together under reflux at the boiling temperature of the mass for 30 minutes. The resulting resinous syrup was dehydrated by heating it at 140° C., yielding a thermoplastic resin that was soluble in alcohol and other organic solvents. When a small amount of glycine, phenacyl chloride, nitrourea, chloroacetamide or other curing agent such as mentioned under Example 1 was added either to the syrupy condensation product or to the dehydrated resin, followed by heating on a 140° C. hot plate, the resin cured to an insoluble, infusible state and showed good plastic flow during curing. Cured films of the resin were hard and tough. The resinous composition of this example is particularly suitable for use as a plasticizer in molding compounds and coating compositions where products of improved flow characteristics are desired. For example, it may be used as a modifier of varnishes of the aminoplast and alkyd-resin types.

*Example 16*

| | Parts |
|---|---|
| (4,6-diamino pyrimidyl-2 thio methyl) phenyl ketone | 26.0 |
| Acetamide | 5.9 |
| Aqueous formaldehyde (approx. 37.1% HCHO) | 56.7 |
| Aqueous solution of sodium hydroxide (0.457 N) | 1.7 | were heated together under reflux at boiling temperature for 30 minutes. A thermoplastic resin was obtained by heating a sample of the resulting resinous syrup on a 135° C. hot plate. The dehydrated syrup was soluble in alcohol and other organic solvents. The thermoplastic resin was potentially heat-curable as shown by the fact that the addition of glycine, chloroacetamide or other curing agent such as mentioned under Example 1 yielded a material that could be cured to an insoluble and infusible state by heating on a 135° C. hot plate.

*Example 17*

| | Parts |
|---|---|
| (4,6-diamino pyrimidyl-2 thio methyl) para-chloroxenyl ketone | 36.2 |
| Glycerine | 9.2 |
| Aqueous formaldehyde (approx. 37.1% HCHO) | 64.8 |
| Sodium hydroxide in 5 parts water | 0.1 | were heated together under reflux at the boiling temperature of the mass for 30 minutes, yielding a viscous resinous syrup. This syrupy condensation product, like the corresponding products of, for instance, Examples 15 and 16, yielded a heat-curable resin when glycine, sulfamic acid, chloroacetamide or other curing agent such as mentioned under Example 1 was incorporated therewith. The heat-convertible resin shows good flow characteristics during curing at temperatures of the order of 130–140° C. and, therefore, would be especially suitable for use in modifying molding compounds and coating compositions to yield products of improved flow characteristics.

*Example 18*

| | Parts |
|---|---|
| (4,6-diamino pyrimidyl-2 thio methyl) phenyl ketone | 26.0 |
| Glycerine | 9.2 |
| Aqueous formaldehyde (approx. 37.1% HCHO) | 64.8 |
| Aqueous solution of sodium hydroxide (0.457 N) | 1.7 | were heated together under reflux at the boiling temperature of the mass for 30 minutes, yielding a thick, syrupy resin having properties much the same as the syrupy condensation product of Example 17.

*Example 19*

| | Parts |
|---|---|
| (4,6-diamino pyrimidyl-2 thio methyl) para-chloroxenyl ketone | 36.2 |
| Polyvinyl alcohol | 26.4 |
| Aqueous formaldehyde (approx. 37.1% HCHO) | 97.2 |
| Sodium hydroxide in 5 parts water | 0.1 | were heated together under reflux at the boiling temperature of the mass for 30 minutes. When a sample of the resulting resinous syrup was heated on a 140° C. hot plate, it bodied to a thermoelastic resin. The addition of a small amount of hydrochloric acid, chloroacetamide, glycine or other curing agent such as mentioned under Example 1 to the syrupy condensation product or to the thermoelastic resin, followed by heating on a 140° C. hot plate, yielded well-cured resins. Samples of the resinous syrup, both with and without a trace of a curing agent such as hydrochloric acid, were applied to glass plates and the coated plates then were baked for several hours at 75–80° C. In all cases the baked films were hard, tough and water-resistant, the films made from compositions containing a curing agent being, in general, somewhat harder and more resistant to water than those made from compositions containing no added curing agent. The films adhered tightly to the glass plates. The resinous material of this example may be used in the preparation of various molding and coating compositions.

*Example 20*

| | Parts |
|---|---|
| (4,6-diamino pyrimidyl-2 thio methyl) phenyl ketone | 26.0 |
| Polyvinyl alcohol | 26.4 |
| Aqueous formaldehyde (approx. 37.1% HCHO) | 97.2 |
| Aqueous solution of sodium hydroxide (0.457 N) | 1.7 | were heated together under reflux at the boiling temperature of the mass for 15 minutes, yielding a viscous, syrupy resin. When a sample of this syrupy resin was heated on a 135° C. hot plate, it bodied to a thermoplastic mass. A heat-curable resinous composition was produced by incorporating a small amount of hydrochloric acid, sulfamic acid or other curing agent such as mentioned under Example 1 either into the syrupy condensation product or into the thermoplastic resin. When a sample of the heat-curable resin was applied to a glass plate and the coated plate then baked for 6 hours at 80° C., a transparent, tough, hard, baked film was formed. This film adhered tightly to the glass surface. The resinous material of this example is suitable for use in the manufacture of molding compounds and in the preparation of various liquid coating and impregnating compositions.

*Example 21*

| | Parts |
|---|---|
| (4,6-diamino pyrimidyl-2 thio methyl) methyl ketone | 99 |
| Aldol | 88 | were mixed together to yield a thick paste, which then was heated for 40 hours at approximately 60° C. The resinous material thereby obtained was insoluble in water but melted when a sample of it was heated on a 140° C. hot plate. A heat-curable composition is produced by incorporating a small amount of a curing agent such as mentioned under Example 1 into the thermoplastic resin. For example, when a small amount of chloroacetamide was added to the thermoplastic resin, a composition was obtained that cured to an insoluble and infusible state when a sample of it was heated for only a few seconds on a 140° C. hot plate.

*Example 22*

| | Parts |
|---|---|
| (4,6-diamino pyrimidyl-2 thio methyl) methyl ketone | 99 |
| Glucose | 180 | were caused to react in the same manner as described under Example 21. The resulting resinous composition had properties that were much the same as the resinous material of Example 21.

It will be understood, of course, by those skilled in the art that the reaction between the aldehyde and the diazine derivative may be effected at temperatures ranging, for example, from room temperature to the fusion or boiling temperatures of the mixed reactants or of solutions of the mixed reactants, the reaction proceeding more slowly at normal temperatures than at elevated temperatures in accordance with the general law of chemical reactions. Thus, instead of effecting reaction between the ingredients of Examples 1 to 20, inclusive, at boiling temperature under reflux, the reaction between the components may be carried out at lower temperatures, for example at temperatures ranging from room temperature to a temperature near the boiling temperature using longer reaction periods and, in some cases, stronger catalysts and higher catalyst concentrations. Likewise, we are not limited to a process which comprises effecting reaction between the pyrimidine derivative and a hydroxyaldehyde at 60° C. as mentioned in Examples 21 and 22, and temperatures either higher or lower may be used as desired or as practical conditions may require.

It also will be understood by those skilled in the art that our invention is not limited to condensation products obtained by reaction between ingredients comprising an aldehyde and the specific pyrimidine derivatives named in the above illustrative examples. Thus, instead of an aldehyde we may use, for example, poly-methylol derivatives of urea, thiourea, selenourea and iminourea, or of substituted ureas, selenoureas, thioureas and iminoureas (numerous examples of which are given in D'Alelio copending application Serial No. 377,524), mono- and poly-(N-carbinol) derivatives of amides of polycarboxylic acids, e. g., maleic, itaconic, fumaric, adipic, malonic, citric, phthalic, etc., mono- and poly-(N-carbinol) derivatives of the aminotriazines, etc. Good results are obtained with active methylene-containing bodies such as a methylol urea, more particularly mono- and di-methylol ureas, and a methylol melamine, e. g., monomethylol melamine and polymethylol melamines (di-, tri-, tetra-, penta- and hexa-methylol melamines). Mixtures of aldehydes and aldehyde-addition products may be employed, e. g., mixtures of formaldehyde and methylol compounds such, for instance, as dimethylol urea, trimethylol melamine, hexamethylol melamine, etc.

The ratio of the aldehydic reactant to the diazine derivative may be varied over a wide range depending, for example, upon the particular properties desired in the final product. Ordinarily these reactants are employed in an amount corresponding to at least one mol of the aldehyde, specifically formaldehyde, for each mol of the diazine derivative. For example, we may use from 1 to 7 or 8 or more mols of an aldehyde for each mol of the diazine derivative. Good results are obtained in manufacturing thermosetting resinous compositions using from about 1½ to 3 mols or more of aldehyde, more particularly formaldehyde, for each mol of diazine derivative. When the aldehyde is available for reaction in the form of an alkylol derivative, more particularly a methylol derivative such, for instance, as dimethylol urea, trimethylol melamine, etc., then higher amounts of such aldehyde-addition products are used, for instance from 2 or 3 up to 12 or 15 or more mols of such alkylol derivatives for each mol of the diazine derivative.

As indicated hereinbefore, and as further shown by a number of the examples, the properties of the fundamental resins of this invention may be varied widely by introducing other modifying bodies before, during or after effecting condensation between the primary components. Thus, as modifying agents we may use, for instance, monohydric alcohols such as methyl, ethyl, propyl, isopropyl, isobutyl, hexyl, etc., alcohols; polyhydric alcohols, e. g., diethylene glycol, triethylene glycol, pentaerythritol, etc.; alcohol-ethers, e. g., ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, etc.; amides, e. g., formamide, stearamide, acrylamide, benzamide, benzene sulfonamides, toluene sulfonamides, adipic diamide, phthalamide, etc.; amines, e. g., ethylene diamine, phenylene diamine, etc.; nitriles, including halogenated nitriles, e. g., acrylonitrile, methacrylonitrile, succinonitrile, chloroacetonitriles, etc.; acylated ureas, including halogenated acylated ureas of the kind described, for example, in D'Alelio Patent No. 2,281,559, issued May 5, 1942; and others.

The modifying bodies also may take the form of high molecular weight bodies with or without resinous characteristics, for example hydrolyzed wood products, formalized cellulose derivatives, lignin, protein-aldehyde condensation products, aminotriazine-aldehyde condensation products, aminotriazole-aldehyde condensation products, etc. Other examples of modifying bodies are the urea-aldehyde condensation products, the aniline-aldehyde condensation products, furfural condensation products, phenol-aldehyde condensation products, modified or unmodified, saturated or unsaturated polyhydric alcohol-polycarboxylic acid condensation products, water-soluble cellulose derivatives, natural gums and resins such as shellac, rosin, etc.; polyvinyl compounds such as polyvinyl esters, e. g., polyvinyl acetate, polyvinyl butyrate, etc., polyvinyl ethers, including polyvinyl acetals, specifically polyvinyl formal, etc.

Instead of effecting reaction between a diazine derivative of the kind embraced by Formula I and an aldehyde, specifically formaldehyde, we may cause an aldehyde to condense with a salt (organic or inorganic) of the diazine derivative and a salt thereof. Examples of organic and inorganic acids that may be used in the preparation of such salts are hydrochloric, sulfuric, phosphoric, boric, acetic, chloroacetic, propionic, butyric, valeric, acrylic, polyacrylic, oxalic, methacrylic, malonic, polymethacrylic, succinic, adipic, malic, maleic, fumaric, benzoic, salicylic, phthalic, camphoric, etc.

Dyes, pigments, plasticizers, mold lubricants, opacifiers and various fillers (e. g., wood flour, glass fibers, asbestos, including defibrated asbestos, mineral wool, mica, cloth cuttings, etc.) may be compounded with the resin in accordance with conventional practice to provide various thermoplastic and thermosetting molding compositions.

The modified and unmodified resinous compositions of this invention have a wide variety of uses. For example, in addition to their use in the production of molding compositions, they may be used as modifiers of other natural and synthetic resins, as laminating varnishes in the production of laminated articles wherein sheet materials, e. g., paper, cloth, sheet asbestos, etc., are coated and impregnated with the resin, superimposed and thereafter united under heat and pressure. They may be used in the production of wire or baking enamels from which insulated wires and other coated products are made, for bonding or cementing together mica flakes to form a laminated mica article, for bonding together abrasive grains in the production of resin-bonded abrasive articles such, for instance, as grindstones, sandpapers, etc., in the manufacture of electrical resistors, etc. They also may be employed for treating cotton, linen and other cellulosic materials in sheet or other form. They also may be used as impregnants for electrical coils and for other electrically insulating applications.

What we claim as new and desire to secure by Letters Patent of the United States is:

1. A composition of matter comprising the reaction product of ingredients comprising an aldehyde and a compound corresponding to the general formula

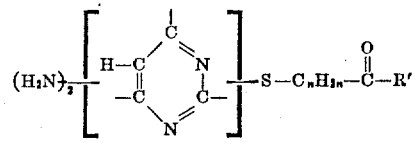

where $n$ represents an integer and is at least 1 and not more than 2, R represents a member of the class consisting of hydrogen and monovalent hydrocarbon and halo-hydrocarbon radicals, and R' represents a member of the class consisting of monovalent aliphatic hydrocarbon radicals and monovalent aromatic and nuclearly halogenated aromatic hydrocarbon radicals.

2. A composition as in claim 1 wherein the aldehyde is formaldehyde.

3. A composition as in claim 1 wherein the reaction product is an alkaline-catalyzed reaction product of the stated components.

4. A composition as in claim 1 wherein the reaction product is an alcohol-modified reaction product of the stated components.

5. A composition as in claim 1 wherein R represents hydrogen.

6. A heat-curable composition comprising a heat-convertible resinous condensation product of ingredients comprising formaldehyde and a compound corresponding to the general formula

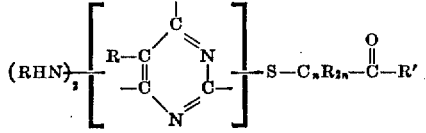

where $n$ represents an integer and is at least 1 and not more than 2, and R' represents a member of the class consisting of monovalent aliphatic hydrocarbon radicals and monovalent aromatic and nuclearly halogenated aromatic hydrocarbon radicals.

7. A product comprising the cured composition of claim 6.

8. A composition comprising the resinous product of reaction of ingredients comprising an aldehyde and a (diamino pyrimidyl thio methyl) aliphatic ketone.

9. A resinous composition comprising the reaction product of ingredients comprising an aldehyde and a (diamino pyrimidyl thio methyl) alkyl ketone.

10. A composition comprising the resinous product of reaction of ingredients comprising an aldehyde and (4,6-diamino pyrimidyl-2 thio methyl) methyl ketone.

11. A composition comprising the resinous product of reaction of ingredients comprising an aldehyde and a (diamino pyrimidyl thio methyl) aromatic ketone.

12. A resinous composition comprising the reaction product of ingredients comprising formaldehyde and (4,6-diamino pyrimidyl-2 thio methyl) phenyl ketone.

13. A composition comprising the resinous product of reaction of ingredients comprising an aldehyde and a (diamino pyrimidyl thio methyl) nuclearly halogenated aromatic ketone.

14. A resinous composition comprising the reaction product of ingredients comprising formaldehyde and (4,6-diamino pyrimidyl-2 thio methyl) para-chloroxenyl ketone.

15. A composition comprising the product of reaction of ingredients comprising a urea, an aldehyde and a compound corresponding to the general formula where $n$ represents an integer and is at least 1 and not more than 2, R represents a member of the class consisting of hydrogen and monovalent hydrocarbon and halo-hydrocarbon radicals, and R' represents a member of the class consisting of monovalent aliphatic hydrocarbon radicals and monovalent aromatic and nuclearly halogenated aromatic hydrocarbon radicals.

16. A composition comprising the product of reaction of ingredients comprising urea, formaldehyde and a compound corresponding to the general formula

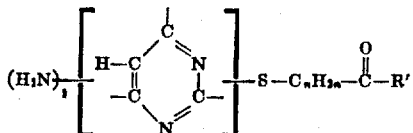

where $n$ represents an integer and is at least 1 and not more than 2, and R' represents a member of the class consisting of monovalent aliphatic hydrocarbon radicals and monovalent aromatic and nuclearly halogenated aromatic hydrocarbon radicals.

17. A composition comprising the product of reaction of ingredients comprising an aminotriazine, an aldehyde and a compound corresponding to the general formula

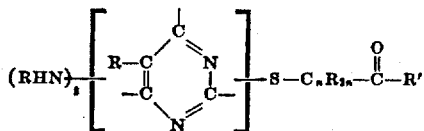

where $n$ represents an integer and is at least 1 and not more than 2, R represents a member of the class consisting of hydrogen and monovalent hydrocarbon and halo-hydrocarbon radicals, and R' represents a member of the class consisting of monovalent aliphatic hydrocarbon radicals and monovalent aromatic and nuclearly halogenated aromatic hydrocarbon radicals.

18. A composition comprising the product of reaction of ingredients comprising melamine, formaldehyde and a compound corresponding to the general formula

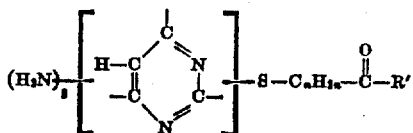

where $n$ represents an integer and is at least 1 and not more than 2, and R' represents a member of the class consisting of monovalent aliphatic hydrocarbon radicals and monovalent aromatic and nuclearly halogenated aromatic hydrocarbon radicals.

19. A heat-curable composition comprising the heat-convertible resinous reaction product of (1) a partial condensation product of ingredients comprising formaldehyde and a compound corresponding to the general formula

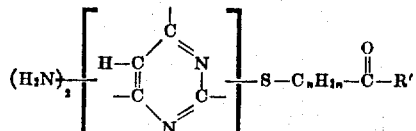

where $n$ represents an integer and is at least 1 and not more than 2, and R' represents a member of the class consisting of monovalent aliphatic hydrocarbon radicals and monovalent aromatic and nuclearly halogenated aromatic hydrocarbon radicals, and (2) a curing reactant.

20. The method of preparing new synthetic compositions which comprises effecting reaction between ingredients comprising an aldehyde and a compound corresponding to the general formula

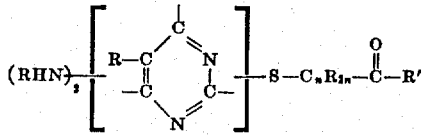

where $n$ represents an integer and is at least 1 and not more than 2, R represents a member of the class consisting of hydrogen and monovalent hydrocarbon and halo-hydrocarbon radicals, and R' represents a member of the class consisting of monovalent aliphatic hydrocarbon radicals and monovalent aromatic and nuclearly halogenated aromatic hydrocarbon radicals.

GAETANO F. D'ALELIO.
JAMES W. UNDERWOOD.

---

CERTIFICATE OF CORRECTION.

Patent No. 2,352,943. July 4, 1944.

GAETANO F. D'ALELIO, ET AL.

It is hereby certified that error appears in the printed specification of the above numbered patent requiring correction as follows: Page 1, first column, line 51, for "idodophenyl" read --iodophenyl--; page 2, second column, line 43, before "Alpha" insert an opening bracket; page 3, second column, line 41, for "ameline" read --ammeline--; page 4, second column, line 37, for "There" read --These--; line 38, for the number "3,325,376" read --2,325,376--; and that the said Letters Patent should be read with this correction therein that the same may conform to the record of the case in the Patent Office.

Signed and sealed this 12th day of September, A. D. 1944.

Leslie Frazer (Seal) Acting Commissioner of Patents.

R' represents a member of the class consisting of monovalent aliphatic hydrocarbon radicals and monovalent aromatic and nuclearly halogenated aromatic hydrocarbon radicals.

16. A composition comprising the product of reaction of ingredients comprising urea, formaldehyde and a compound corresponding to the general formula

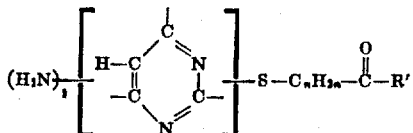

where $n$ represents an integer and is at least 1 and not more than 2, and R' represents a member of the class consisting of monovalent aliphatic hydrocarbon radicals and monovalent aromatic and nuclearly halogenated aromatic hydrocarbon radicals.

17. A composition comprising the product of reaction of ingredients comprising an aminotriazine, an aldehyde and a compound corresponding to the general formula

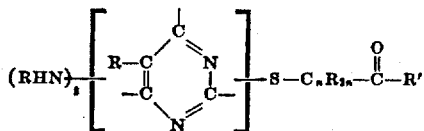

where $n$ represents an integer and is at least 1 and not more than 2, R represents a member of the class consisting of hydrogen and monovalent hydrocarbon and halo-hydrocarbon radicals, and R' represents a member of the class consisting of monovalent aliphatic hydrocarbon radicals and monovalent aromatic and nuclearly halogenated aromatic hydrocarbon radicals.

18. A composition comprising the product of reaction of ingredients comprising melamine, formaldehyde and a compound corresponding to the general formula

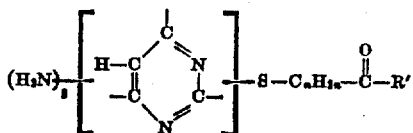

where $n$ represents an integer and is at least 1 and not more than 2, and R' represents a member of the class consisting of monovalent aliphatic hydrocarbon radicals and monovalent aromatic and nuclearly halogenated aromatic hydrocarbon radicals.

19. A heat-curable composition comprising the heat-convertible resinous reaction product of (1) a partial condensation product of ingredients comprising formaldehyde and a compound corresponding to the general formula

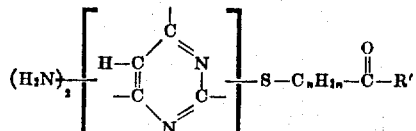

where $n$ represents an integer and is at least 1 and not more than 2, and R' represents a member of the class consisting of monovalent aliphatic hydrocarbon radicals and monovalent aromatic and nuclearly halogenated aromatic hydrocarbon radicals, and (2) a curing reactant.

20. The method of preparing new synthetic compositions which comprises effecting reaction between ingredients comprising an aldehyde and a compound corresponding to the general formula

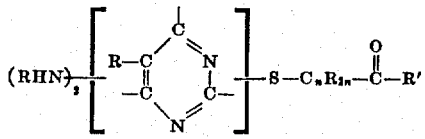

where $n$ represents an integer and is at least 1 and not more than 2, R represents a member of the class consisting of hydrogen and monovalent hydrocarbon and halo-hydrocarbon radicals, and R' represents a member of the class consisting of monovalent aliphatic hydrocarbon radicals and monovalent aromatic and nuclearly halogenated aromatic hydrocarbon radicals.

GAETANO F. D'ALELIO.
JAMES W. UNDERWOOD.

---

CERTIFICATE OF CORRECTION.

Patent No. 2,352,943.   July 4, 1944.

GAETANO F. D'ALELIO, ET AL.

It is hereby certified that error appears in the printed specification of the above numbered patent requiring correction as follows: Page 1, first column, line 51, for "idodophenyl" read --iodophenyl--; page 2, second column, line 43, before "Alpha" insert an opening bracket; page 3, second column, line 41, for "ameline" read --ammeline--; page 4, second column, line 37, for "There" read --These--; line 38, for the number "3,325,376" read --2,325,376--; and that the said Letters Patent should be read with this correction therein that the same may conform to the record of the case in the Patent Office.

Signed and sealed this 12th day of September, A. D. 1944.

Leslie Frazer (Seal)   Acting Commissioner of Patents.